(12) United States Patent
Shedletsky et al.

(10) Patent No.: US 12,436,629 B2
(45) Date of Patent: Oct. 7, 2025

(54) CAPACITIVE TOUCH PANEL FOR SENSING MECHANICAL INPUTS TO A DEVICE

(71) Applicant: Apple Inc., Cupertino, CA (US)

(72) Inventors: Anna-Katrina Shedletsky, Mountain View, CA (US); Christopher Werner, San Jose, CA (US); Colin M. Ely, Sunnyvale, CA (US); Fletcher R. Rothkopf, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/739,088

(22) Filed: Jun. 10, 2024

(65) Prior Publication Data

US 2024/0370104 A1    Nov. 7, 2024

Related U.S. Application Data

(63) Continuation of application No. 18/351,438, filed on Jul. 12, 2023, now Pat. No. 12,008,178, which is a
(Continued)

(51) Int. Cl.
*G06F 3/0362* (2013.01)
*G06F 3/041* (2006.01)
*G06F 3/044* (2006.01)

(52) U.S. Cl.
CPC ............ *G06F 3/0362* (2013.01); *G06F 3/041* (2013.01); *G06F 3/0412* (2013.01); *G06F 3/0443* (2019.05); *G06F 3/0446* (2019.05)

(58) Field of Classification Search
CPC ...... G06F 3/0362; G06F 3/041; G06F 3/0412; G06F 3/0443; G06F 3/0446; G06F 3/0393
See application file for complete search history.

(56) References Cited

U.S. PATENT DOCUMENTS 5,483,261 A    1/1996    Yasutake
5,488,204 A    1/1996    Mead et al.
(Continued)

FOREIGN PATENT DOCUMENTS

EP    1691263 A1    8/2006
JP    2000-163031 A    6/2000
(Continued)

OTHER PUBLICATIONS

Notice of Allowance received for U.S. Appl. No. 17/448,879, mailed on Jun. 6, 2024, 5 pages.
(Continued)

*Primary Examiner* — David Tung
(74) *Attorney, Agent, or Firm* — Kubota & Basol LLP

(57) ABSTRACT

A device including a mechanical input and a touch-sensitive surface for detecting one or more touch inputs and an input from the mechanical input. The touch-sensitive surface can include a first portion for detecting at least the touch inputs, and a second portion for detecting at least the mechanical input. The touch-sensitive surface can include a first portion for detecting at least the touch inputs and the mechanical input. The mechanical input can comprise an electrically conductive material, and the mechanical input can be detected based on capacitance measurements between the mechanical input and the touch-sensitive surface. The device can include a sensing element, the mechanical input can comprise an electrically insulating material, and the mechanical input can be detected based on capacitance measurements between the touch-sensitive surface and the sensing element. The device can include logic to differentiate between the touch inputs and the mechanical input.

20 Claims, 7 Drawing Sheets

Related U.S. Application Data continuation of application No. 18/154,774, filed on Jan. 13, 2023, now Pat. No. 11,740,715, which is a continuation of application No. 17/647,583, filed on Jan. 10, 2022, now Pat. No. 11,556,190, which is a continuation of application No. 14/915,224, filed as application No. PCT/US2014/031255 on Mar. 19, 2014, now Pat. No. 11,221,697, which is a continuation of application No. PCT/US2013/057161, filed on Aug. 28, 2013.

(56) References Cited

U.S. PATENT DOCUMENTS

| | | | |
|---|---|---|---|
| 5,825,352 | A | 10/1998 | Bisset et al. |
| 5,835,079 | A | 11/1998 | Shieh |
| 5,880,411 | A | 3/1999 | Gillespie et al. |
| 6,188,391 | B1 | 2/2001 | Seely et al. |
| 6,252,825 | B1 | 6/2001 | Perotto |
| 6,310,610 | B1 | 10/2001 | Beaton et al. |
| 6,323,846 | B1 | 11/2001 | Westerman et al. |
| 6,690,387 | B2 | 2/2004 | Zimmerman et al. |
| 7,015,894 | B2 | 3/2006 | Morohoshi |
| 7,184,064 | B2 | 2/2007 | Zimmerman et al. |
| 7,663,607 | B2 | 2/2010 | Hotelling et al. |
| 8,390,573 | B2 | 3/2013 | Trout |
| 8,479,122 | B2 | 7/2013 | Hotelling et al. |
| 8,810,524 | B1 | 8/2014 | Rosenberg et al. |
| 10,073,562 | B2 | 9/2018 | Mo et al. |
| 10,254,896 | B2 | 4/2019 | Mori et al. |
| 10,725,591 | B1 | 7/2020 | Maharyta et al. |
| 11,157,109 | B1 | 10/2021 | Shorten et al. |
| 2003/0234768 | A1 | 12/2003 | Rekimoto et al. |
| 2004/0108861 | A1* | 6/2004 | Germiquet ............ G01F 23/265 324/663 |
| 2004/0113819 | A1 | 6/2004 | Gauthey et al. |
| 2004/0155871 | A1 | 8/2004 | Perski et al. |
| 2004/0189617 | A1 | 9/2004 | Gerpheide et al. |
| 2004/0212586 | A1 | 10/2004 | Denny |
| 2006/0197753 | A1 | 9/2006 | Hotelling |
| 2006/0256090 | A1 | 11/2006 | Huppi |
| 2007/0191070 | A1 | 8/2007 | Rao |
| 2008/0238879 | A1 | 10/2008 | Jaeger et al. |
| 2009/0059730 | A1 | 3/2009 | Lyons et al. |
| 2009/0195394 | A1* | 8/2009 | Johnson ................ H04M 1/18 340/584 |
| 2010/0171715 | A1 | 7/2010 | Huska et al. |
| 2010/0328251 | A1 | 12/2010 | Sinclair |
| 2011/0001703 | A1 | 1/2011 | Shaw et al. |
| 2011/0050620 | A1 | 3/2011 | Hristov |
| 2011/0057899 | A1 | 3/2011 | Sleeman et al. |
| 2011/0175845 | A1* | 7/2011 | Honda ................ G06F 3/0447 345/174 |
| 2012/0139577 | A1 | 6/2012 | Lee |
| 2013/0120258 | A1 | 5/2013 | Maus |
| 2013/0194230 | A1 | 8/2013 | Kawaguchi et al. |
| 2014/0180481 | A1 | 6/2014 | Park et al. |
| 2015/0002448 | A1 | 1/2015 | Brunet et al. |
| 2015/0049043 | A1 | 2/2015 | Yousefpor |
| 2016/0216801 | A1 | 7/2016 | Shedletsky et al. |
| 2017/0090599 | A1 | 3/2017 | Kuboyama et al. |
| 2018/0224962 | A1 | 8/2018 | Mori |
| 2018/0367139 | A1 | 12/2018 | Pribisic et al. |
| 2019/0220115 | A1 | 7/2019 | Mori et al. |
| 2019/0237963 | A1 | 8/2019 | Wuerstlein et al. |
| 2022/0011920 | A1 | 1/2022 | Shorten et al. |
| 2022/0058355 | A1 | 2/2022 | Yoshida |
| 2022/0129102 | A1 | 4/2022 | Shedletsky et al. |
| 2023/0152908 | A1 | 5/2023 | Shedletsky et al. |
| 2023/0367405 | A1 | 11/2023 | Shedletsky et al. |

FOREIGN PATENT DOCUMENTS

| | | |
|---|---|---|
| JP | 2002-342033 A | 11/2002 |
| WO | 2001/033540 A1 | 5/2001 |

OTHER PUBLICATIONS

Patent Board Decision received for U.S. Appl. No. 17/448,879, mailed on May 10, 2024, 10 pages.
Decision on Appeal received for U.S. Appl. No. 14/915,224, mailed on Jun. 30, 2021, 10 pages.
Examiner's Answer to Appeal Brief received for U.S. Appl. No. 14/915,224, mailed on Oct. 6, 2020, 11 pages.
Examiner's Answer to Appeal Brief received for U.S. Appl. No. 17/448,879, mailed on Sep. 18, 2023, 23 pages.
Final Office Action received for U.S. Appl. No. 14/915,224, mailed on Jan. 14, 2019, 8 pages.
Final Office Action received for U.S. Appl. No. 14/915,224, mailed on Nov. 18, 2019, 9 pages.
Final Office Action received for U.S. Appl. No. 17/448,879, mailed on Jan. 9, 2023, 19 pages.
International Search Report received for PCT Patent Application No. PCT/US2013/057161, mailed on Aug. 7, 2014, 6 pages.
International Search Report received for PCT Patent Application No. PCT/US2014/031255, mailed on Aug. 8, 2014, 2 pages.
Non-Final Office Action received for U.S. Appl. No. 14/915,224, mailed on Aug. 9, 2018, 7 pages.
Non-Final Office Action received for U.S. Appl. No. 14/915,224, mailed on Jul. 22, 2019, 6 pages.
Non-Final Office Action received for U.S. Appl. No. 16/786,921, mailed on Dec. 10, 2020, 22 pages.
Non-Final Office Action received for U.S. Appl. No. 17/448,879, mailed on Jun. 24, 2022, 19 pages.
Notice of Allowability received for U.S. Appl. No. 16/786,921, mailed on Jul. 16, 2021, 2 pages.
Notice of Allowance received for U.S. Appl. No. 14/915,224, mailed on Sep. 7, 2021, 5 pages.
Notice of Allowance received for U.S. Appl. No. 16/786,921, mailed on Jul. 1, 2021, 8 pages.
Notice of Allowance received for U.S. Appl. No. 17/647,583, mailed on Sep. 14, 2022, 11 pages.
Notice of Allowance received for U.S. Appl. No. 18/154,774, mailed on Apr. 21, 2023, 10 pages.
Notice of Allowance received for U.S. Appl. No. 18/351,438, mailed on Feb. 7, 2024, 13 pages.
Restriction Requirement received for U.S. Appl. No. 14/915,224, mailed on Apr. 4, 2018, 10 pages.
Lee et al., "A Multi-Touch Three Dimensional Touch-Sensitive Tablet", CHI'85 Proceedings, Apr. 1985, pp. 21-25.
Rubine, Dean, "Combining Gestures and Direct Manipulation", CHI'92, May 3-7, 1992, pp. 659-660.
Rubine, Dean H., "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.
Westerman, Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.
Notice of Allowance received for U.S. Appl. No. 17/448,879, mailed on Sep. 25, 2024, 8 pages.

* cited by examiner

CAPACITIVE TOUCH PANEL FOR SENSING MECHANICAL INPUTS TO A DEVICE

CROSS-REFERENCE TO RELATED APPLICATIONS

This application is a continuation of U.S. patent application Ser. No. 18/351,438, filed Jul. 12, 2023 (published as U.S. Publication No. 2023-0367405), which is a continuation of U.S. patent application Ser. No. 18/154,774, filed Jan. 13, 2023 (issued as U.S. Pat. No. 11,740,715), which is a continuation of U.S. patent application Ser. No. 17/647,583, filed Jan. 10, 2022 (issued as U.S. Pat. No. 11,556,190), which is a continuation of U.S. patent application Ser. No. 14/915,224, filed Feb. 27, 2016 (issued as U.S. Pat. No. 11,221,697), which is a National Phase Application under 35 U.S.C. § 371 of International Application No. PCT/US2014/031255, filed Mar. 19, 2014, which is a continuation of International Application No. PCT/US2013/057161, filed Aug. 28, 2013, the contents of which are herein incorporated by reference in their entireties for all purposes.

FIELD OF THE DISCLOSURE

This relates generally to sensing mechanical inputs on a device, and more specifically to doing so using a capacitive touch panel on the device.

BACKGROUND OF THE DISCLOSURE

Many electronic devices have capacitive touch panels, as such panels can provide users a natural and intuitive input method. Touch panels can, for example, allow a user to perform various functions by touching the touch sensor panel using a finger, stylus or other object at a location often dictated by a user interface (UI) being displayed on the touch panel. In general, touch panels can recognize a touch and the position of the touch on the touch panel, and the electronic device can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing fields used to detect touch can extend beyond the surface of the touch panel, and objects approaching the surface may be detected near the surface without actually touching the surface. Further, some touch panels can be multi-touch panels for detecting one or more touches thereon.

In addition to touch panels, many electronic devices may also have mechanical inputs, such as buttons and/or switches. These mechanical inputs can control power (i.e., on/off) and volume, among other functions. However, mechanical inputs, such as buttons or rotary inputs, can have considerable component costs associated with them, as the mechanical inputs generally can include structure for providing tactile feedback to a user (e.g., the "click" of a button) and also structure for sensing an input from the mechanical input. These two structures can be complex. Further, such structures can occupy substantial volume in electronic devices, which can make it difficult to reduce the sizes of such devices.

SUMMARY OF THE DISCLOSURE

The following description includes examples of capacitively sensing mechanical inputs using a touch panel in a device. The mechanical inputs can be inputs such as linear buttons (e.g., power or volume), rotary inputs (e.g., volume knob), slide switches (e.g., hold switch or ringer switch), on/off push/push buttons, and multi-position rotary inputs (e.g., rotary version of a slide switch to select a setting), for example. In some examples, a mechanical input can be substantially electrically conductive, and the touch panel can sense an input from the mechanical input based on a capacitance measurement between the touch panel and the mechanical input. In some examples, the mechanical input can be substantially electrically insulating, and the touch panel can sense an input from the mechanical input based on a capacitance measurement between the touch panel and a sensor, where the mechanical input can be disposed between the touch panel and the sensor. In some examples, inputs from the mechanical input can be differentiated from touch inputs based on various characteristics of the touch inputs and the mechanical input (e.g., size, shape, magnitude, etc.). In some examples, the mechanical input can include one or more localized extensions to facilitate the touch panel's determination of a position of the mechanical input. In some examples, the mechanical input can include structure for providing tactile response.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Some electronic devices can include both touch screens (or touch pads and the like) for sensing touch inputs, and mechanical inputs, such as buttons and/or switches. These mechanical inputs can require associated structures for providing tactile feedback to a user (e.g., the "click" of a button) and for sensing inputs from the mechanical inputs. Such associated structures can be expensive to manufacture, and can occupy substantial volume in the electronic devices, which can make it difficult to reduce the sizes of such devices. The above cost and volume concerns can be alleviated by configuring the touch screens/touch pads in electronic devices to couple to and sense not only touch inputs from a user, but also to couple to and sense mechanical inputs, such as buttons, inside the devices. In this way, the associated structures that can be required for a mechanical input can be simplified, reduced or eliminated. Additionally, using touch screens/touch pads to sense mechanical inputs can decouple the structures used to provide tactile feedback to a user from the structures used for the actual sensing of the mechanical inputs. As such, the physical profile of the tactile response of a button, for example, can be tuned independently from, and without changing, the performance of the button's input detection. Note that although this specification may primarily refer to touch screens for convenience, it should be understood that the various examples of this disclosure include other touch-sensitive surfaces such as touch pads, trackpads and the like.

Figure 1:
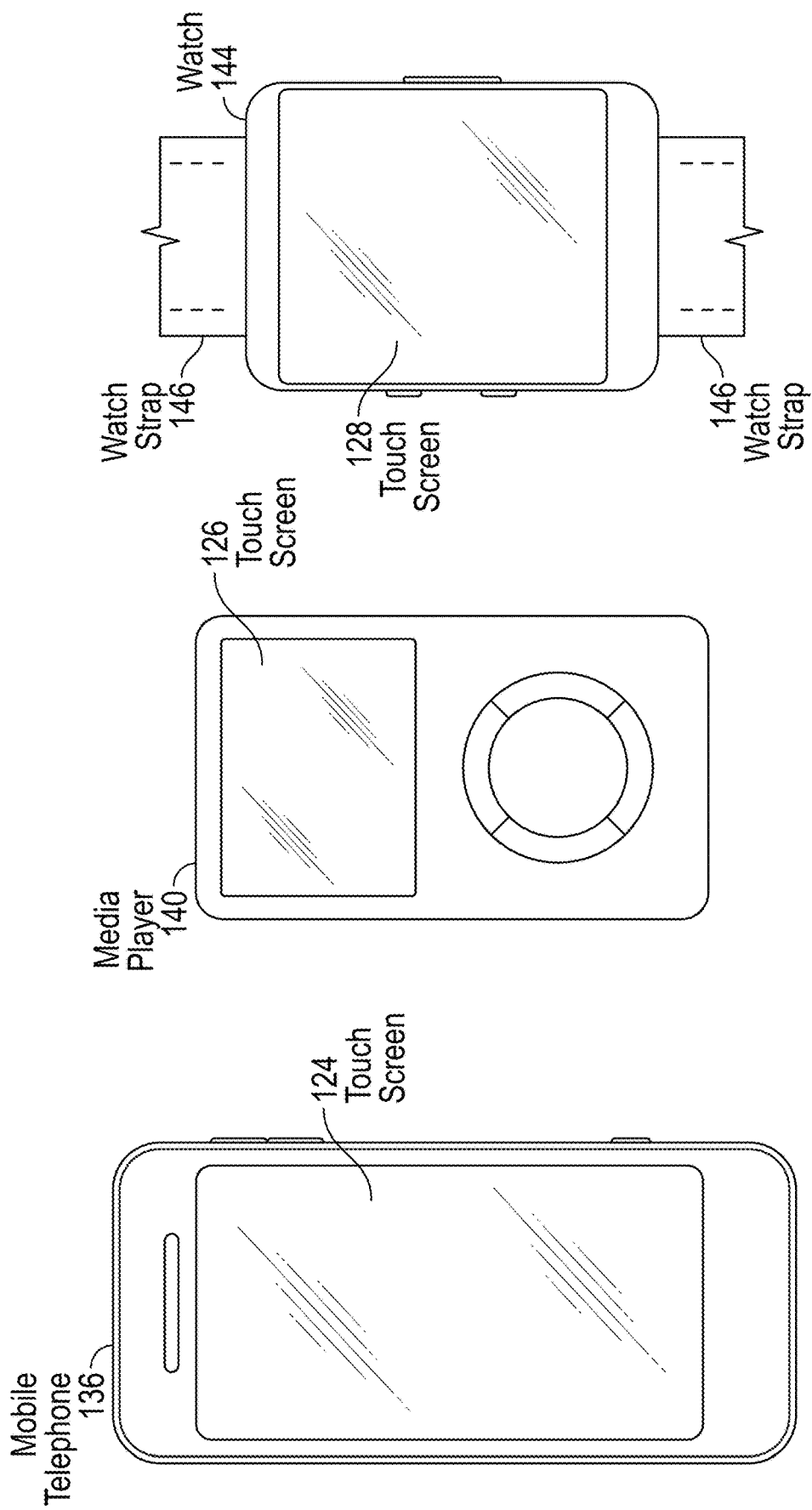
FIG. 1A illustrates an example mobile telephone that includes a touch screen.
FIG. 1B illustrates an example digital media player that includes a touch screen.
FIG. 1C illustrates an example watch that includes a touch screen.

FIGS. 1A-1C show example systems in which mechanical input sensing according to examples of the disclosure may be implemented. FIG. 1A illustrates an example mobile telephone 136 that includes touch screen 124. FIG. 1B illustrates an example digital media player 140 that includes touch screen 126. FIG. 1C illustrates an example watch 144 that includes touch screen 128. Touch screens 124, 126 and 128 may be based on, for example, self capacitance or mutual capacitance, or another touch sensing technology. For example, in a self capacitance based touch system, an individual electrode with a self-capacitance to ground can be used to form a touch pixel (touch node) for detecting touch. As an object approaches the touch pixel, an additional capacitance to ground can be formed between the object and the touch pixel. The additional capacitance to ground can result in a net increase in the self-capacitance seen by the touch pixel. This increase in self-capacitance can be detected and measured by a touch sensing system to determine the positions of one or more objects when they touch the touch screen. A mutual capacitance based touch system can include, for example, drive regions and sense regions, such as drive lines and sense lines. For example, drive lines can be formed in rows while sense lines can be formed in columns (i.e., drive lines and sense lines can be orthogonal). Touch pixels (touch nodes) can be formed at the intersections or adjacencies (in single layer configurations) of the rows and columns. During operation, the rows can be stimulated with an AC waveform and a mutual capacitance can be formed between the row and the column of the touch pixel. As an object approaches the touch pixel, some of the charge being coupled between the row and column of the touch pixel can instead be coupled onto the object. This reduction in charge coupling across the touch pixel can result in a net decrease in the mutual capacitance between the row and the column and a reduction in the AC waveform being coupled across the touch pixel. This reduction in the charge-coupled AC waveform can be detected and measured by the touch sensing system to determine the positions of one or more objects when they touch the touch screen. In some examples, a touch screen can be multi-touch, single touch, projection scan, full-imaging multi-touch, or any capacitive touch.

Figure 2:
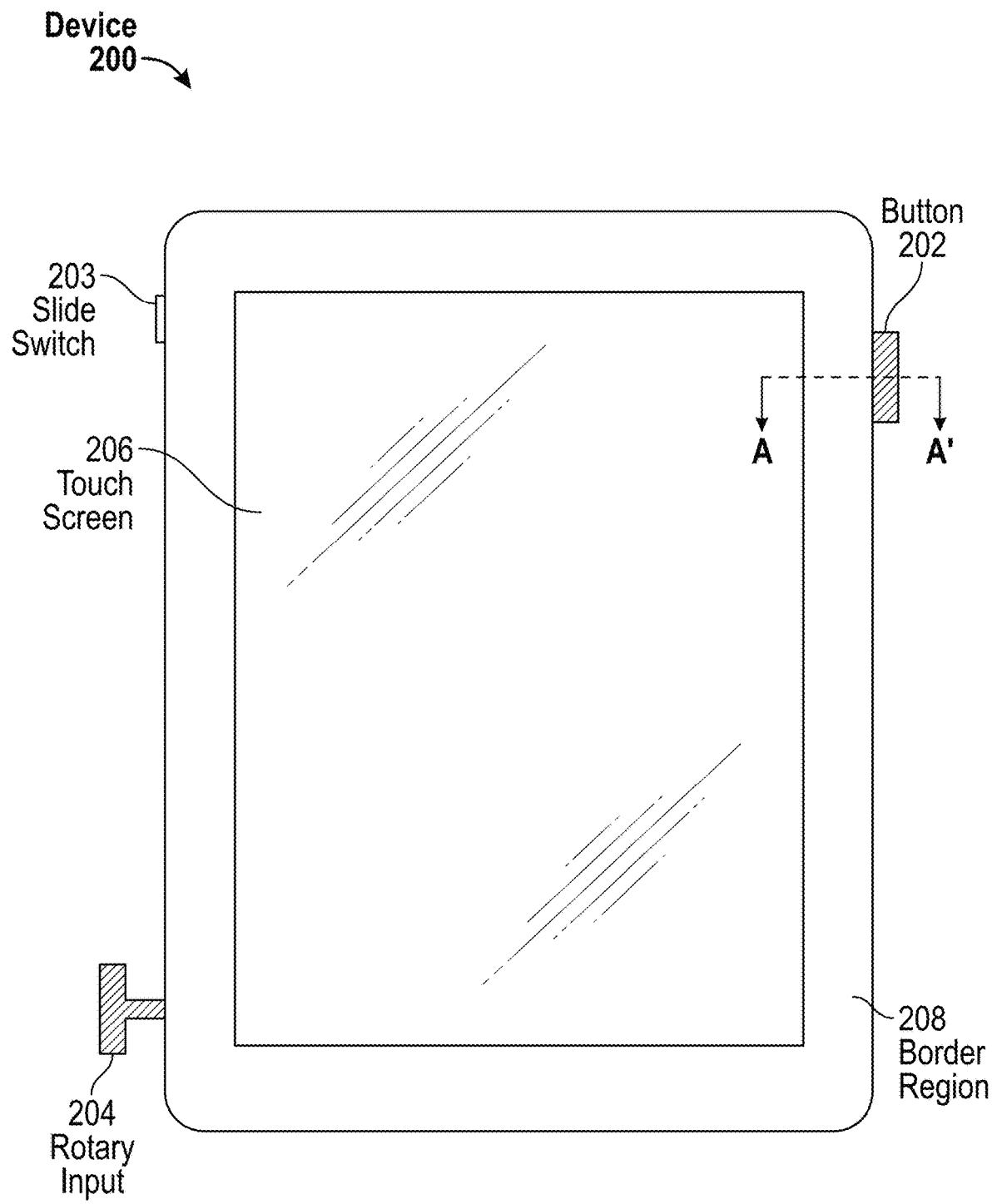
FIG. 2 illustrates an expanded view of an exemplary device according to examples of this disclosure.

FIG. 2 illustrates an expanded view of an exemplary device 200 according to examples of this disclosure. Device 200 can be any of mobile telephone 136, digital media player 140, watch 144, or any other wearable and/or electronic device. Device 200 can include touch screen 206 surrounded by border region 208. Border region 208 can be a region between touch screen 206 and the edge of device 200. In some examples, device 200 may not have border region 208, and may instead have a surface composed only of touch screen 206. Device 200 can also include mechanical inputs such as button 202, slide switch 203 and rotary input 204. Button 202 can be, for example, a linear button, which, in operation, can slide into and out of device 200 in a linear fashion. Rotary input 204 can be, for example, a knob. Slide switch 203 can be, for example, a switch that slides vertically along the edge of device 200. Button 202, slide switch 203 and rotary input 204 can be actuated by a user to interact with device 200 in various ways. For example, rotary input 204 can be a volume knob by which a user can increase or decrease a volume output by speakers that can be included in device 200. Button 202 can be a power button by which a user can turn device 200 on or off. Slide switch 203 can be a slide switch for muting the device. Button 202, slide switch 203 and rotary input 204 are provided by way of example only. It is understood that device 200 can include fewer or more mechanical inputs than the ones illustrated. It is further understood that device 200 can include mechanical inputs other than buttons, slide switches or rotary inputs, such as on/off push/push buttons and multi-position rotary inputs (e.g., rotary version of a slide switch to select a setting), for example. Other types of mechanical inputs are also within the scope of this disclosure.

Figure 3:
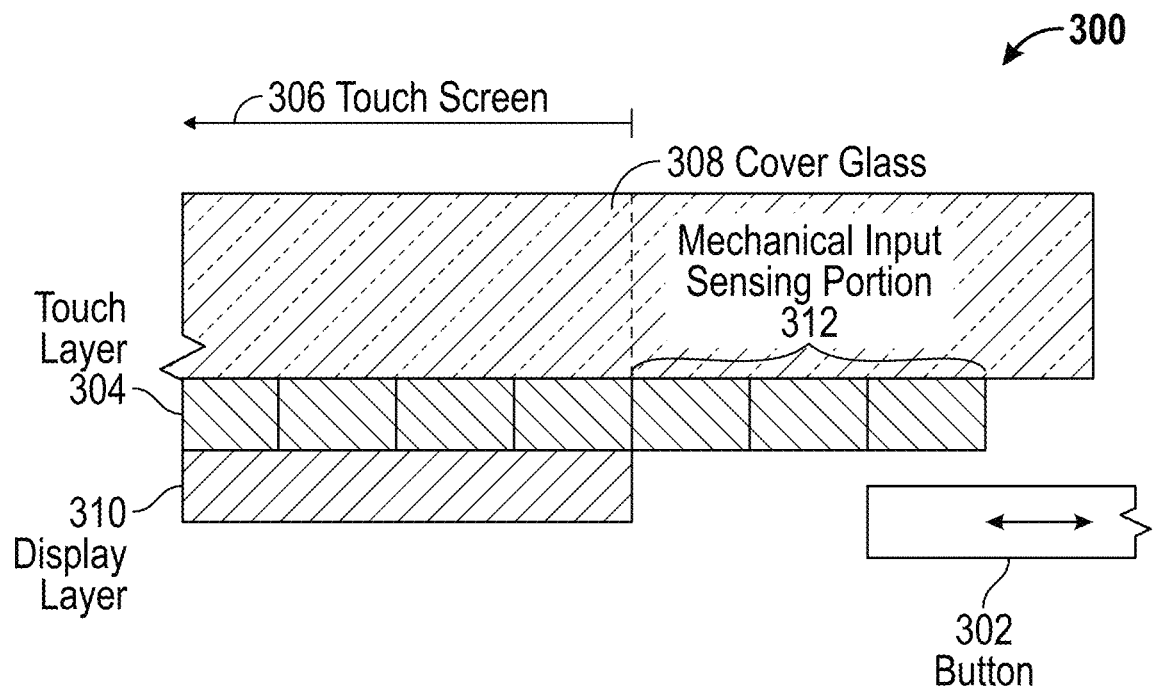
FIG. 3 illustrates an exemplary configuration for sensing input from a button according to examples of this disclosure.

FIG. 3 illustrates an exemplary configuration 300 for sensing input from button 302 according to examples of this disclosure. The illustration of FIG. 3 can be that of a cross-section A-A' of device 200 of FIG. 2. Configuration 300 can include display layer 310, touch layer 304 and cover glass (or plastic) 308. Display layer 310 can be one or more layers of electronics for displaying images on touch screen 306. Touch layer 304 can be one or more layers of electronics for sensing touch on touch screen 306. Cover glass 308 can be one or more layers for protecting touch layer 304 and/or display layer 310 from, for example, a user's touch on touch screen 306. Although illustrated as three separate layers, it is understood that cover glass 308, touch layer 304 and display layer 310 can be fabricated as a single layer, or can be fabricated as two separate layers or four or more separate layers. For example, display layer 310 and touch layer 304 can be fabricated as one layer, and cover glass 308 can be fabricated as a separate layer. For ease of description, the examples of the disclosure will assume that display layer 310, touch layer 304 and cover glass 308 are separate layers, as illustrated.

Button 302 can be a linear button, as described above. Further, part of button 302 can extend under mechanical input sensing portion 312 of touch layer 304. Mechanical input sensing portion 312 can be a portion of touch layer 304 that can be used to capacitively sense mechanical inputs. Button 302 can be substantially electrically conductive so as to allow for capacitive sensing of the button by mechanical input sensing portion 312. Mechanical input sensing portion 312 can capacitively sense the extension of button 302 in a similar manner as described above with respect to FIGS. 1A-IC, except that instead of sensing changes in capacitance due to touches on touch screen 306 from above, the mechanical input sensing portion can capacitively sense changes in capacitance due to movements of button 302 from below. In particular, as button 302 extends into mechanical input sensing portion 312, the mechanical input sensing portion can sense changes in capacitance due to the extension of the button. As button 302 retracts from mechanical input sensing portion 312, the mechanical input sensing portion can similarly sense changes in capacitance due to the retraction of the button. A device that incorporates configuration 300 can determine position information for button 302 (i.e., whether the button is depressed) based on the above capacitance measurements. The position information determined can be binary (i.e., whether button 302 is depressed or is not depressed) or can be continuous (i.e., the degree to which the button is depressed). Button 302 can be placed close to mechanical input sensing portion 312 of touch layer 304 to maximize sensing performance, as capacitive effects between the mechanical input sensing portion and the button can generally be inversely proportional to the distance between the mechanical input sensing portion and the button.

Although mechanical input sensing portion 312 is illustrated as being outside of touch screen 306 and display layer 310, it is understood that the mechanical input sensing portion can be located inside the boundaries of the display layer and the touch screen (i.e., the mechanical input sensing portion can be dual-purpose for sensing both touch inputs from above and button 302 from below). Various ways to differentiate between touch inputs from above and mechanical inputs from below will be described later. In some examples, mechanical input sensing portion 312 can be specifically designed for sensing mechanical inputs such as button 302. In some examples, mechanical input sensing portion 312 can be fabricated using the same fabrication process and the same layers as touch layer 304. In some examples, mechanical input sensing portion 312 can be fabricated using a different fabrication process than that used to fabricate touch layer 304. In some examples, mechanical input sensing portion 312 can be positioned so as to minimize or reduce interference with normal touch sensing on touch screen 306 (e.g., the mechanical input sensing portion can be positioned sufficiently far away from the rest of touch layer 304). With respect to the examples disclosed above, for ease of description, the examples of this disclosure will be described using the structure illustrated in FIG. 3, although it is understood that the scope of this disclosure is not so limited.

Figure 4:
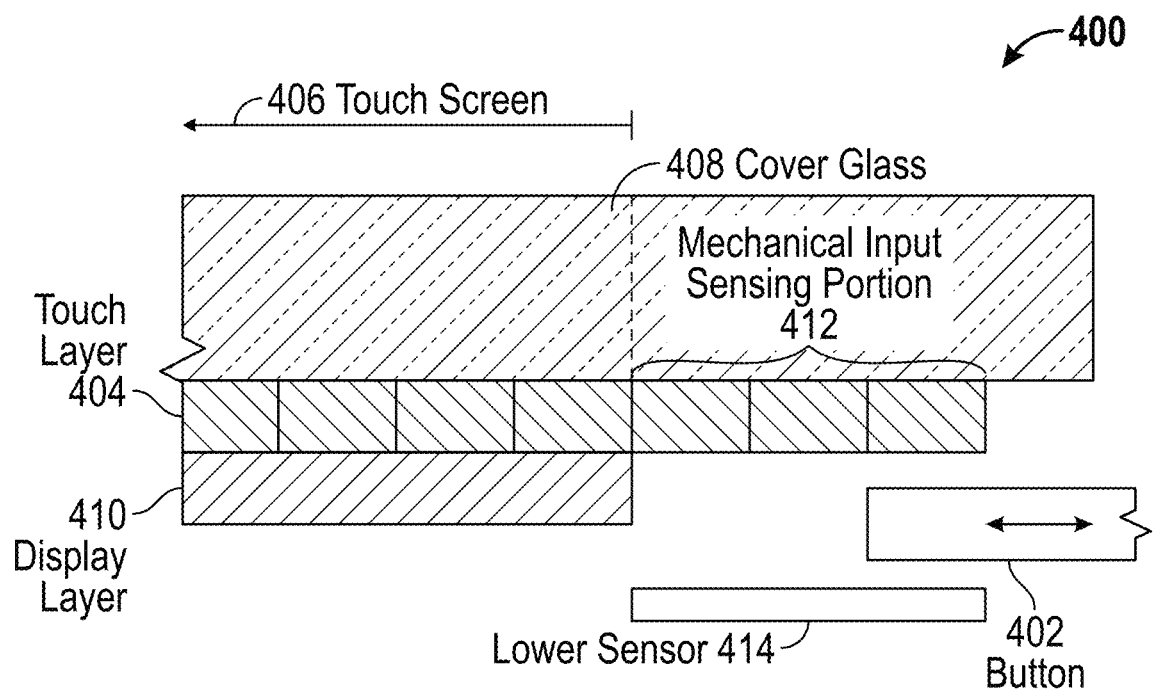
FIG. 4 illustrates an alternative exemplary configuration for sensing input from a button according to examples of this disclosure.

FIG. 4 illustrates an alternative exemplary configuration 400 for sensing input from button 402 according to examples of this disclosure. Configuration 400 of can be substantially that of FIG. 3, except for the addition of lower sensor 414 below button 402. Button 402 can be disposed between lower sensor 414 and mechanical input sensing portion 412 of touch layer 404. In this configuration, instead of sensing the movement of button 402 using only mechanical input sensing portion 412, the movement of the button can be sensed by measuring changes in capacitance between the mechanical input sensing portion and lower sensor 414. Button 402, in this instance, can be composed of a substantially electrically insulating material, such as a dielectric, so as to allow for capacitance measurements to be performed between mechanical input sensing portion 412 and lower sensor 414.

In operation, as button 402 extends into the space between mechanical input sensing portion 412 and lower sensor 414, the capacitance between the mechanical input sensing portion and the lower sensor can change. This change in capacitance can be a result of a difference between a dielectric constant of the material of which button 402 is composed and a dielectric constant of the unoccupied space between mechanical input sensing portion 412 and lower sensor 414. Based on the above change in capacitance, the device can determine if and how far button 402 has been depressed into mechanical input sensing portion 412.

In the detection schemes described above, it can be helpful to isolate changes in capacitance sensed by the mechanical input sensing portion that are a result of activity from above (e.g., user touches on the touch screen) from those that are a result of activity from below (e.g., changes in position of a mechanical input). In some examples, the mechanical inputs can be designed such that their movements can result in changes in capacitance that differ by a large amount from changes in capacitance due to touch activities (e.g., ten times larger/smaller). For example, if button 302 and mechanical input sensing portion 312 are configured such that changes in capacitance due to movements of button 302 are at least ten times smaller than changes in capacitance due to touch activity on touch screen 306 from above, the device can identify small capacitance changes as being related to button input activity, and large capacitance changes as being related to touch activity. This ratio of 10:1 is provided by way of example only. Other differences in scale can be suitable for mechanical input detection as described in this disclosure. In some examples, mechanical input sensing portion 312 can be specifically designed to be sensitive to such differences in scale.

In some examples, capacitances related to mechanical inputs and capacitances related to touch activity can be differentiated based on the respective "sizes" (shape and/or area) of their capacitive "footprints." For example, button 302 can be designed to be smaller than the size of a typical contact on touch screen 306 resulting from a touch input. By doing so, when the device senses a "small sized" capacitance measurement (i.e., a capacitance measurement related to button 302), it can determine that it is sensing changes in capacitance due to the button, and not touch activity. In contrast, when the device senses a capacitance measurement with a size on the order of a typical touch contact resulting from touch input activity, the device can determine that it is sensing changes in capacitance due to touch inputs, and not button 302. The size of a capacitive footprint can be determined based on how many touch sensors or pixels on the touch screen have detected the presence of the touch or mechanical input. The description above is provided by way of example only, and it is understood that the capacitive "footprints" of the mechanical inputs can be designed to be larger, instead of smaller, than the capacitive "footprints" of typical touch activity. In other related examples, the shape of the capacitive footprint can also be used to determine whether a touch or mechanical input event has been detected. For example, an ellipsoidal footprint can be determined to be a touch, while a narrow rectangular footprint can be determined to be a mechanical input event. In some examples, mechanical input sensing portion 312 can be specifically designed to sense the above sizes and/or shapes. For example, the capacitive sensing pixel density in the area responsible for sensing the mechanical input can be made higher to enable higher-resolution sensing of the mechanical input and its size and/or shape. Such design of mechanical input sensing portion 312 can be utilized in other examples of this disclosure as well.

In some examples, capacitive detection of mechanical inputs can be performed in a dedicated area of the touch panel; for example, in an area outside of the display area of the touch screen. This dedicated area can be positioned such that touch input activity on the touch screen from above can have substantially little effect on capacitances measured by the dedicated area from below. For example, the dedicated area (e.g., mechanical input sensing portion 312) can be placed outside the edge of touch screen 306. All capacitance measurements sensed by mechanical input sensing portion 312 can be identified as measurements of mechanical inputs (e.g., button 302).

Figure 5:
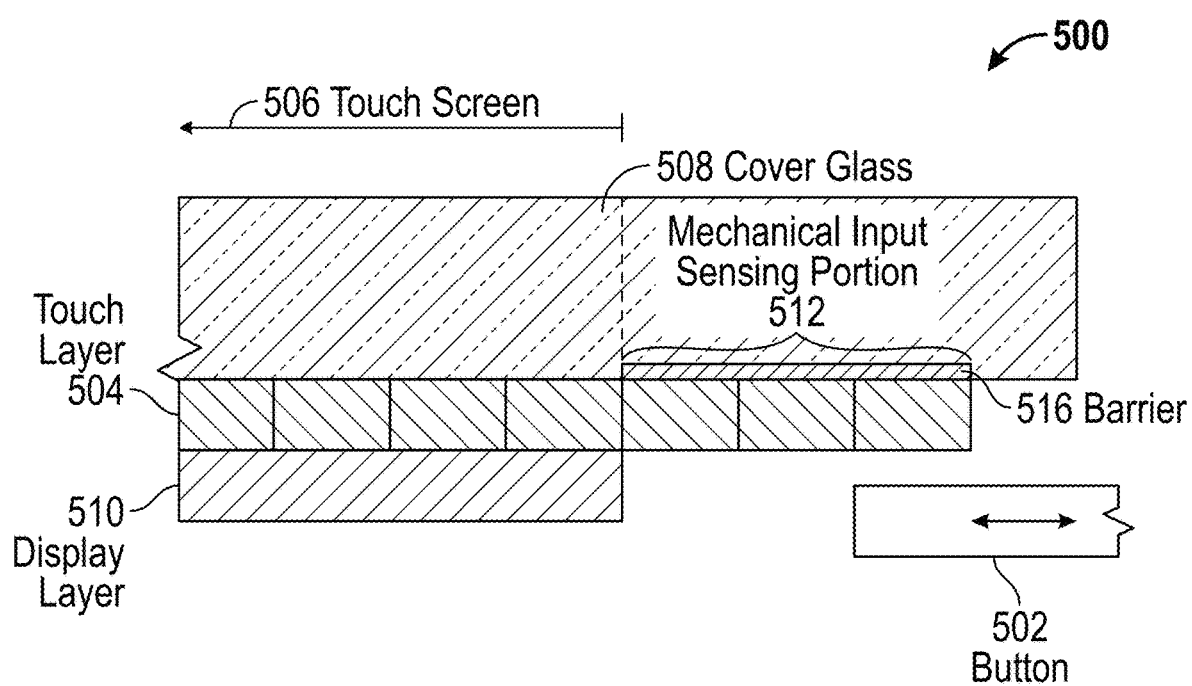
FIG. 5 illustrates an example configuration in which a mechanical input sensing portion can be shielded from touch activity occurring on a touch screen above by a barrier.

In some examples, the region of the touch layer that is used for sensing mechanical inputs can be shielded from touch activity occurring on the touch screen above by a barrier. FIG. 5 illustrates an example configuration 500 in which mechanical input sensing portion 512 can be shielded from touch activity occurring on touch screen 506 above by barrier 516. The configuration in FIG. 5 can be substantially that of FIGS. 3-4, though the configuration of FIG. 3 is illustrated by way of example, and it is understood that the scope of this disclosure is not limited to the configuration of FIG. 3. Barrier 516 can be positioned above mechanical input sensing portion 512 of touch layer 504 so as to shield the mechanical input sensing portion from touch activity that may occur on touch screen 506. Barrier 516 can be any substantially electrically conductive material, such as various metals. Such an electrically conductive material can act as a capacitor in series between a user's fingers and mechanical input sensing portion 512, and can make interference from touch activity on touch screen 506 more uniform and easier to filter. Barrier 516 can also be a material with a lower dielectric constant than cover glass 508 (e.g., air), or can simply be a larger gap between the surface of the cover glass and mechanical input sensing portion 512, so as to reduce capacitive effects on the mechanical input sensing portion due to touch activity on touch screen 506. Barrier 516 can also be any combination of the above.

By placing barrier 516 as illustrated, changes in capacitance that may be measured by mechanical input sensing portion 512 can be primarily those due to movements of button 502. The particular positioning of barrier 516 is provided by way of example only. It is understood that barrier 516 or other structures can be positioned in other ways so as to substantially shield mechanical input sensing portion 512 from touch activity on touch screen 506.

Figure 6A:
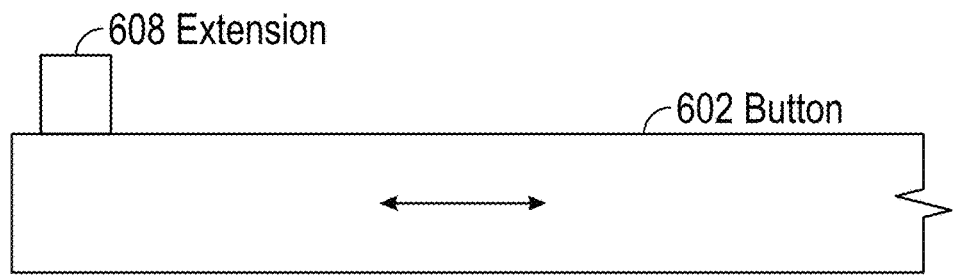
FIG. 6A illustrates an exemplary button having a single extension.
Figure 6B:
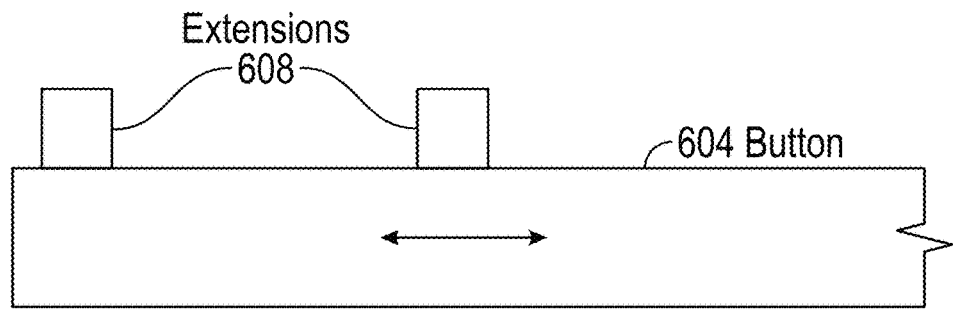
FIG. 6B illustrates an exemplary button having two extensions.
Figure 6C:
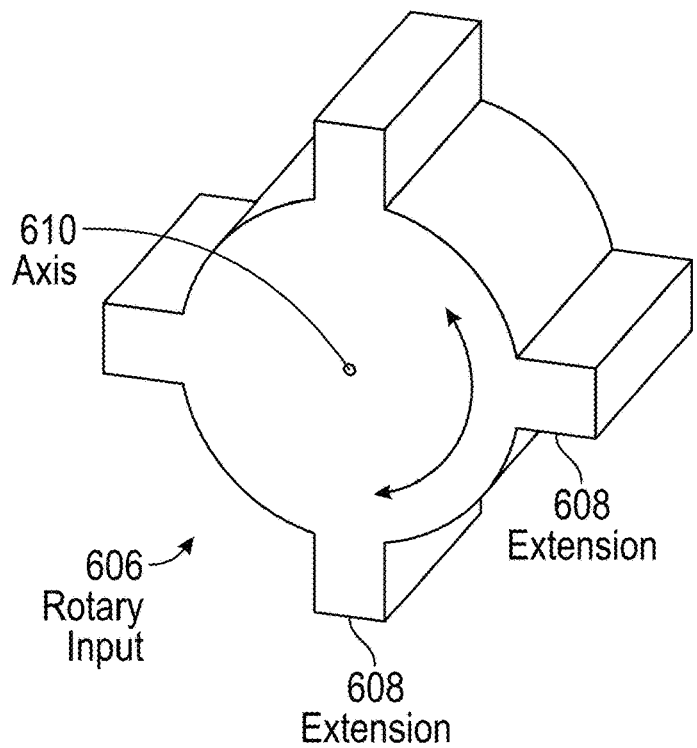
FIG. 6C illustrates a cross-section of an exemplary rotary input according to examples of this disclosure.

In some examples, it can be useful to be able to sense localized singularities (e.g., peaks or valleys) in mechanical input capacitance measurements to be able to more accurately determine the positions of the mechanical inputs. FIGS. 6A-6C illustrate various configurations of mechanical inputs with localized extensions to aid in determining the positions of the mechanical inputs. FIG. 6A illustrates an exemplary button 602 having a single extension 608. Button 602 can be substantially the same as button 302 in FIG. 3 or 4, except that the button can include extension 608. Extension 608 can be composed of the same material (or a similar material) as the rest of button 602. In particular, in the mode of operation illustrated in FIG. 3, extension 608 can be a substantially electrically conductive material; in the mode of operation illustrated in FIG. 4, extension 608 can be a substantially electrically insulating material.

Extension 608 can provide a peak at a defined position in the capacitance measured by the mechanical input sensing portion of the touch layer of the device. For example, because extension 608 can be closer to the mechanical input sensing portion as compared with the rest of button 602, the capacitance measured at the location of the extension can be greater than the capacitance measured at other locations on the button (i.e., the extension can create a peak in the capacitance profile measured by the mechanical input sensing portion). The device can identify this peak and its corresponding location. Therefore, the device can substantially identify a particular position at which extension 608 exists, and can determine the input state of button 602 based on the particular position. In this example, extension 608 can be placed near the end of button 602 to provide a location for the end of the button, however it is understood that the extension can be placed at different locations based on the desired operation of the button.

FIG. 6B illustrates an exemplary button 604 having two extensions 608. In some examples, it can be useful to have a two-stage linear button: one level of depression being identified as one input to the device, and a second level of depression being identified as another input to the device. A two-stage linear button can be realized by including, for example, two extensions 608 at two different positions on button 604. If the device senses a first peak associated with the first extension 608 (i.e., the extension on the end of button 604), it can interpret the sensing of the first peak as being indicative of the first stage of the button having been actuated. If the device senses a second peak associated with the second extension 608 (i.e., the extension in the middle section of button 604), it can interpret the sensing of the second peak as being indicative of the second stage of the button having been actuated. Accordingly, a two-stage capacitively sensed mechanical button can be realized. The positioning of the first and second extensions 608 in FIG. 6B is provided by way of example only, and it is understood that other positions can be suitable for use in buttons and other mechanical inputs as well, or in buttons with more than two stages.

FIG. 6C illustrates a cross-section of an exemplary rotary input 606 according to examples of this disclosure. Rotary input 606 can rotate around axis 610. Rotary input can include one or more extensions 608 around its periphery; in this case, the rotary input can include four extensions. As rotary input 606 rotates, peaks in capacitance corresponding to extensions 608 can appear and subside as the extensions move closer to, and further away from, the mechanical input sensing portion of the device. As each peak appears in the capacitance measured by the mechanical input sensing portion, the device can determine that rotary input 606 has been rotated by an amount equivalent to the rotational distance between adjacent extensions 608 on the rotary input, and the device can process the input accordingly (e.g., the device can increase the volume of its speakers by one "unit" amount). Each subsequent appearance of a peak can be processed similarly. The device can also determine the direction from which the peaks appear and the direction towards which the peaks subside, and the device can therefore determine the direction of rotation of rotary input 606. This direction determination can identify whether a user is increasing or decreasing the volume on the device, for example.

Although the examples above have been provided with reference to button and rotary inputs, it is understood that the disclosed extensions can be similarly utilized in other types of mechanical inputs, for example, slide switches (e.g., hold switch or ringer switch), on/off push/push buttons, and multi-position rotary inputs (e.g., rotary version of a slide switch to select a setting).

Figure 7:
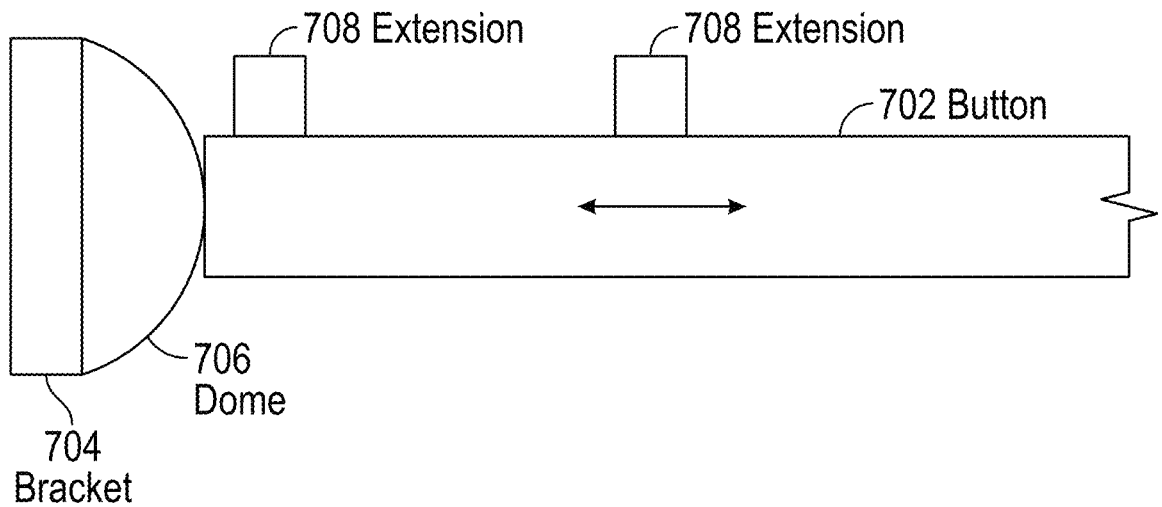
FIG. 7 illustrates an exemplary button for use in a capacitive mechanical input sensing environment, the button having a structure that can provide a user with tactile feedback of the button's operation.

Because the capacitive sensing schemes of this disclosure can decouple the design and incorporation of structures that provide tactile response from structures that perform mechanical input sensing, various mechanical structures can be added to the mechanical inputs to provide the desired tactile feedback with substantially no regard for how those structures may impact sensing performance of the mechanical inputs. This tactile feedback can be realized by various techniques that can be substantially independent of the sensing of the mechanical inputs, because the sensing can be done capacitively, as described above. FIG. 7 illustrates exemplary button 702 for use in a capacitive mechanical input sensing environment, the button having a structure that can provide a user with tactile feedback of the button's operation. The configuration of button 702 can be substantially that of button 604 in FIG. 6B. It is understood that the configuration of button 702 is provided by way of example only, and that the examples of this disclosure can be applied to other types of mechanical inputs, such as other button designs or scroll wheels.

The end of button 702 can be positioned next to dome 706, which can be anchored on bracket 704. Dome 706 can be any structure that can provide resistance or tactile feedback to button 702, as will be described below. A dome is provided by way of example only, and it is understood that other structures may be suitable for use in the examples of this disclosure. Bracket 704 can be any structure that can provide structural support for dome 706. As button 702 is depressed towards bracket 704, dome 706 can provide tactile feedback as to how much the button has been depressed, similar to the tactile feedback provided by a standard mechanical button. For example, dome 706 can provide higher resistance as button 702 is depressed more. Additionally or alternatively, dome 706 can provide a "clicking" noise or feeling once button 702 has been depressed to a specified position. The exemplary tactile feedback described above can occur while the position of button 702 can be sensed capacitively, as described above. Therefore, the tactile feedback of button 702 can be decoupled from the sensing of the depression of the button, and the one or more structures used to provide tactile feedback can be designed substantially independently from any structures used for sensing of the input from the button, which can provide potential design flexibility and space savings. It is understood that the resistance and "clicking" tactile responses described above are provided by way of example only, and that structures that provide other tactile responses are also within the scope of this disclosure.

In addition to decoupling the sensing of button 702 and its tactile response, the mechanical input detection of this disclosure can be beneficial in improving the waterproofing performance of a device according to examples of this disclosure. Waterproofing a device with a conventional mechanical button, for example, can be difficult because of the various structures that can be necessary for the button's operation, as described above. These sometimes complicated structures can require mechanical penetration of a waterproofing seal (e.g., by a wire needed to mechanically sense a mechanical input), which can jeopardize the integrity of the waterproofing seal, potentially causing leaks. In some examples of this disclosure, the device and its associated electronics can be in a waterproofed area. The exemplary tactile feedback structures described above can be positioned outside of the waterproofed area (as these structures need not be waterproofed in some examples), and an input from a mechanical input (e.g., a button) can be capacitively sensed through a sealed interface. In this way, mechanical penetration of the sealed interface, by for example a wire for mechanically sensing a mechanical input, can be avoided, and the structural integrity of the waterproofed area can be maintained.

In addition to sensing mechanical inputs, capacitance measurements as described above can be used to detect the presence of a component (e.g., SIM card, SIM tray, lanyard, audio jack connector or other connector) in the device of this disclosure. It is understood that such component detection can be realized in a manner similar to that described above for mechanical input detection (e.g., instead of sensing a button, a portion of the touch panel can be used to sense the presence of a SIM tray).

Figure 8:
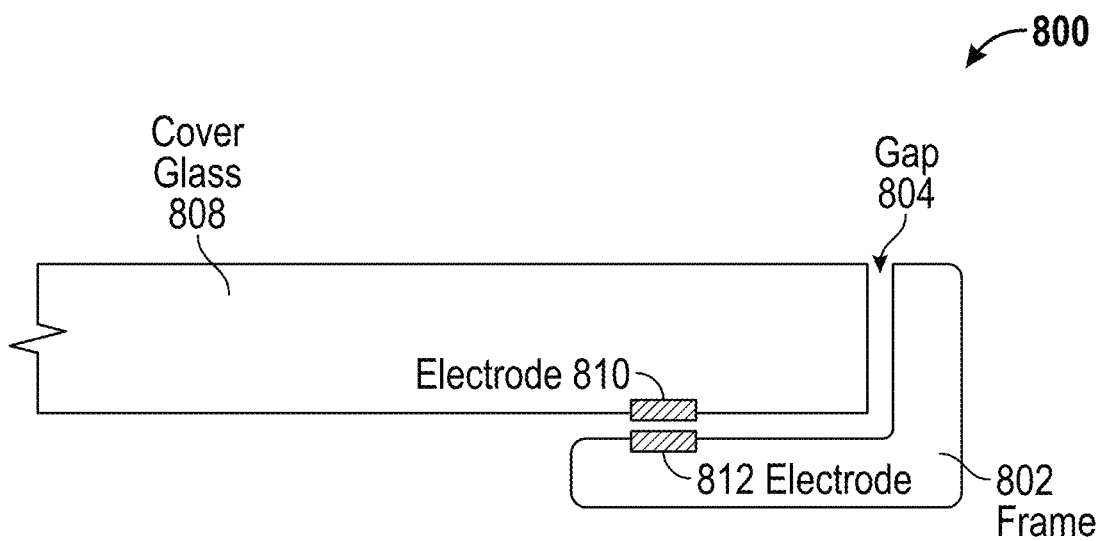
FIG. 8 illustrates an exemplary configuration for detecting water or water damage in the device according to examples of this disclosure.

Capacitance measurements can also be used to detect the presence of water in the device of this disclosure, or to detect corrosion resulting from water damage to the device. FIG. 8 illustrates an exemplary configuration 800 for detecting water or water damage in the device according to examples of this disclosure. Configuration 800 can be an edge region of the device where cover glass (or plastic) 808 can be secured to the device by frame 802. For ease of description, no touch layer or display layer is illustrated in FIG. 8, but it is understood that such layers can exist as part of, or attached to, cover glass 808. Gap 804 can exist between frame 802 and cover glass 808. Gap 804 can exist for various reasons; for example, manufacturing reasons and/or by design. Gap 804 can be an air gap, or it can be filled with one or more materials. The following description will be provided assuming that gap 804 is an air gap.

Electrode 810 can be positioned on the bottom surface of cover glass 808, and electrode 812 can be positioned on an adjacent top surface of frame 802. Electrodes 810 and 812 can be positioned opposite each other so as to allow for a capacitance measurement to be taken between the two, and the electrodes can be substantially parallel to each other.

Under normal operating conditions (i.e., no water present and no water damage), the capacitance measured between electrodes 810 and 812 can be substantially that of a parallel plate capacitor having air as the dielectric between its two plates. If water enters gap 804, the capacitance between electrodes 810 and 812 can change, because the dielectric constant of water can be different than the dielectric constant of air. When the device senses this change in capacitance between electrodes 810 and 812, it can identify that water has entered the device through gap 804. In addition to sensing water, the device can also sense other substances that may be occupying gap 804. In particular, the device can calculate the dielectric constant of the substances based on the capacitance measured between electrodes 810 and 812, and can map the calculated dielectric constant to those of known substances.

In some examples, water, or some other substance, may not currently exist in gap 804 between electrodes 810 and 812, but may have previously existed in the gap. In some examples, the device can sense this previous existence of water in gap 804. For example, water may have caused corrosive damage to either or both of electrodes 810 and 812. In such a scenario, the capacitance sensed between electrodes 810 and 812 can be affected by the corrosion of one or both of those electrodes. The device can determine, based on the changed capacitance, that water damage, such as corrosion, has occurred. Configuration 800 is provided by way of example only, and it is understood that other configurations may be suitable for water and water damage detection, and are equally within the scope of this disclosure. Further, the device can include logic coupled to electrodes 810 and 812 for measuring the capacitance between the electrodes, and for determining whether damage, such as water damage, has occurred.

The above-described scheme for detecting water and corrosion can also be applied to the structures of this disclosure that are directed to sensing mechanical inputs. For example, corrosion or water on or near button 302 can be sensed by mechanical input sensing portion 312 of touch layer 304 in a manner similar to that described above with reference to FIG. 8. The configuration of FIG. 4 can similarly be used for water and/or corrosion detection, as described above. Further, it is understood that such water and/or corrosion detection, though described here with reference to a button, can be performed with other types of mechanical inputs as well.

Figure 9:
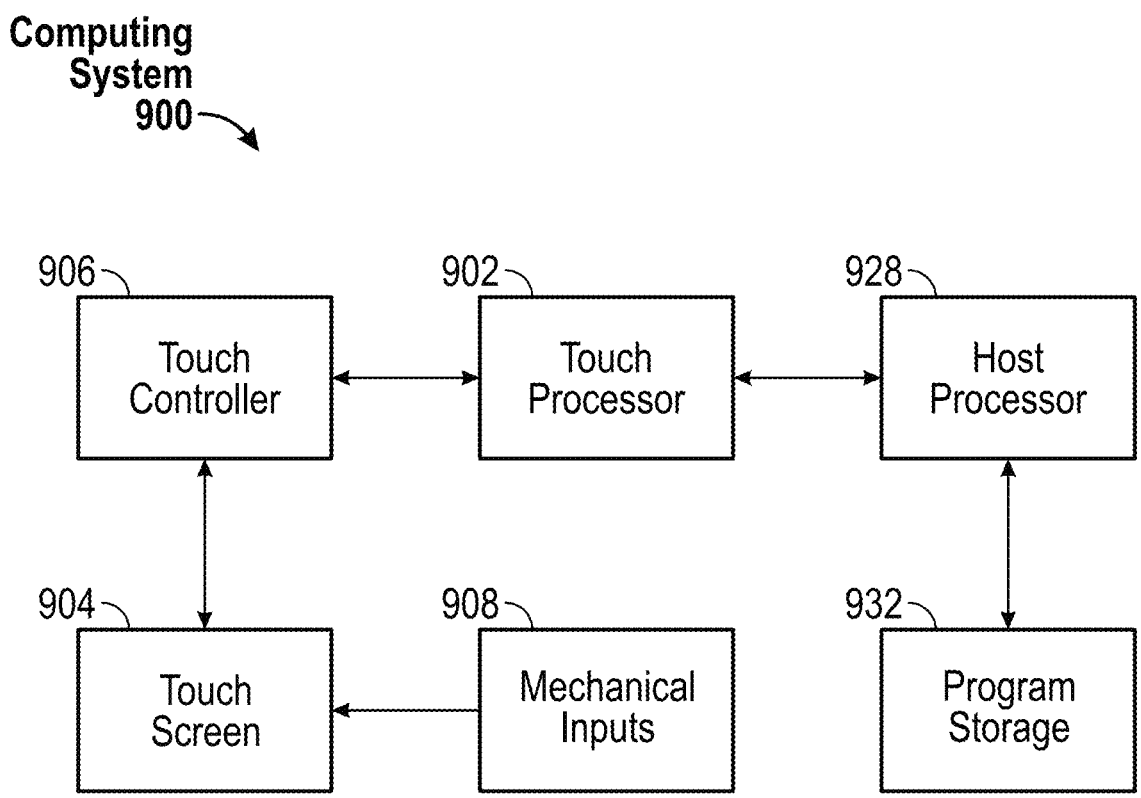
FIG. 9 illustrates an example computing system for implementing the mechanical input sensing according to examples of the disclosure.

FIG. 9 illustrates an example computing system 900 for implementing the mechanical input sensing according to examples of the disclosure. Computing system 900 can be included in, for example, mobile telephone 136, media player 140, watch 144 or any mobile or non-mobile computing device and/or wearable device that includes a touch screen, or more generally, a touch-sensitive surface. Computing system 900 can include a touch sensing system including one or more touch processors 902, touch controller 906 and touch screen 904. Touch screen 904 can be a touch screen adapted to sense both touch inputs and mechanical inputs 908, as described in this disclosure. Touch controller 906 can include circuitry and/or logic configured to sense both touch inputs and mechanical inputs 908 on touch screen 904. In some examples, touch controller 906 and touch processor 902 can be integrated into a single application specific integrated circuit (ASIC).

Computing system 900 can also include host processor 928 for receiving outputs from touch processor 902 and performing actions based on the outputs. Host processor 928 can be connected to program storage 932. For example, host processor 928 can contribute to generating an image on touch screen 904 (e.g., image of a user interface (UI)), and can use touch processor 902 and touch controller 906 to detect one or more touches on or near touch screen 904. Host processor 928 can also contribute to sensing and/or processing mechanical inputs 908 using touch screen 904, as described in this disclosure. The touch and/or mechanical inputs 908 can be used by computer programs stored in program storage 932 to perform actions in response to the touch and/or mechanical inputs. For example, touch inputs can be used by computer programs stored in program storage 932 to perform actions that can include moving an object such as a cursor or pointer, scrolling or panning, adjusting control settings, opening a file or document, viewing a menu, making a selection, executing instructions, operating a peripheral device connected to the host device, answering a telephone call, placing a telephone call, and other actions that can be performed in response to touch inputs. Mechanical inputs 908 can be used by computer programs stored in program storage 932 to perform actions that can include changing a volume level, locking the touch screen, turning on the touch screen, taking a picture, and other actions that can be performed in response to mechanical inputs. Host processor 928 can also perform additional functions that may not be related to touch and/or mechanical input processing.

Therefore, according to the above, some examples of the disclosure are directed to a device comprising a mechanical input, and a touch-sensitive surface configured to detect one or more touch inputs and an input from the mechanical input. Additionally or alternatively to one or more of the examples disclosed above, in some examples, the touch-sensitive surface comprises a first portion for detecting at least the one or more touch inputs, and a second portion for detecting at least the input from the mechanical input. Additionally or alternatively to one or more of the examples disclosed above, in some examples, the touch-sensitive surface comprises a first portion for detecting at least the one or more touch inputs and the input from the mechanical input. Additionally or alternatively to one or more of the examples disclosed above, in some examples, the mechanical input comprises an electrically conductive material, and detecting the input from the mechanical input comprises detecting the input from the mechanical input based on one or more capacitance measurements between the mechanical input and the touch-sensitive surface. Additionally or alternatively to one or more of the examples disclosed above, in some examples, the device further comprises a sensing element, wherein the mechanical input comprises an electrically insulating material and is disposed between the touch-sensitive surface and the sensing element, and detecting the input from the mechanical input comprises detecting the input from the mechanical input based on one or more capacitance measurements between the touch-sensitive surface and the sensing element. Additionally or alternatively to one or more of the examples disclosed above, in some examples, the device further comprises a barrier, wherein the barrier at least partially shields the second portion from the one or more touch inputs. Additionally or alternatively to one or more of the examples disclosed above, in some examples, the device further comprises logic, the logic configured to differentiate between the one or more touch inputs and the input from the mechanical input. Additionally or alternatively to one or more of the examples disclosed above, in some examples, differentiating comprises differentiating between the one or more touch inputs and the input from the mechanical input based on a difference in magnitude of a capacitance measurement associated with the one or more touch inputs and a capacitance measurement associated with the input from the mechanical input. Additionally or alternatively to one or more of the examples disclosed above, in some examples, differentiating comprises differentiating between the one or more touch inputs and the input from the mechanical input based on a difference in size of a capacitance measurement associated with the one or more touch inputs and a capacitance measurement associated with the input from the mechanical input. Additionally or alternatively to one or more of the examples disclosed above, in some examples, the mechanical input comprises one or more extensions, and the touch-sensitive surface is further configured to detect a position of each of the one or more extensions. Additionally or alternatively to one or more of the examples disclosed above, in some examples, the device further comprises a structure for providing a tactile response for the mechanical input. Additionally or alternatively to one or more of the examples disclosed above, in some examples, the device further comprises a removable component, wherein the touch-sensitive surface is further configured to detect a presence of the removable component. Additionally or alternatively to one or more of the examples disclosed above, in some examples, the touch-sensitive surface is further configured to detect damage to the device.

Some examples of the disclosure are directed to a device comprising a first electrode, a second electrode, and logic coupled to the first electrode and the second electrode, wherein the logic is configured to detect damage to the device based on a capacitance measurement between the first electrode and the second electrode.

Some examples of the disclosure are directed to a method comprising detecting an input from a mechanical input using a touch-sensitive surface, the touch-sensitive surface configured to detect the input from the mechanical input and one or more touch inputs. Additionally or alternatively to one or more of the examples disclosed above, in some examples, the touch-sensitive surface comprises a first portion for detecting at least the one or more touch inputs, and a second portion for detecting at least the input from the mechanical input. Additionally or alternatively to one or more of the examples disclosed above, in some examples, the touch-sensitive surface comprises a first portion for detecting at least the one or more touch inputs and the input from the mechanical input. Additionally or alternatively to one or more of the examples disclosed above, in some examples, the mechanical input comprises an electrically conductive material, and detecting the input from the mechanical input comprises detecting the input from the mechanical input based on one or more capacitance measurements between the mechanical input and the touch-sensitive surface. Additionally or alternatively to one or more of the examples disclosed above, in some examples, the mechanical input comprises an electrically insulating material and is disposed between the touch-sensitive surface and a sensing element, and detecting the input from the mechanical input comprises detecting the input from the mechanical input based on one or more capacitance measurements between the touch-sensitive surface and the sensing element. Additionally or alternatively to one or more of the examples disclosed above, in some examples, a barrier at least partially shields the second portion from the one or more touch inputs. Additionally or alternatively to one or more of the examples disclosed above, in some examples, the method further comprises differentiating between the one or more touch inputs and the input from the mechanical input. Additionally or alternatively to one or more of the examples disclosed above, in some examples, differentiating comprises differentiating between the one or more touch inputs and the input from the mechanical input based on a difference in magnitude of a capacitance measurement associated with the one or more touch inputs and a capacitance measurement associated with the input from the mechanical input. Additionally or alternatively to one or more of the examples disclosed above, in some examples, differentiating comprises differentiating between the one or more touch inputs and the input from the mechanical input based on a difference in size of a capacitance measurement associated with the one or more touch inputs and a capacitance measurement associated with the input from the mechanical input. Additionally or alternatively to one or more of the examples disclosed above, in some examples, the mechanical input comprises one or more extensions, the method further comprising detecting a position of each of the one or more extensions. Additionally or alternatively to one or more of the examples disclosed above, in some examples, the method further comprises providing a tactile response for the mechanical input.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A device comprising:
    a frame configured to secure a cover glass layer to the device;
    a gap between the frame and the cover glass layer;
    a first electrode positioned on a bottom surface of the cover glass layer and a second electrode positioned opposite the first electrode on an adjacent top surface of the frame; and
    a controller coupled to the first electrode and the second electrode and configured to detect a capacitance between the first electrode and the second electrode, wherein detecting the capacitance between the first electrode and the second electrode includes:
        determining a dielectric constant of a substance between the first electrode and the second electrode based on the capacitance between the first electrode and the second electrode;
        identifying the substance between the first electrode and the second electrode based on the determined dielectric constant; and
        determining that the identified substance has entered the gap based on the determined dielectric constant.

2. The device of claim 1, wherein the first electrode and the second electrode are substantially parallel to each other.

3. The device of claim 1, further comprising a touch-sensitive surface disposed on the cover glass layer.

4. The device of claim 1, further comprising:
    a mechanical input element, wherein at least a portion of the mechanical input element is disposed within the device, and the mechanical input element is manipulable by a user to cause the mechanical input element to move within the device; and
    a touch-sensitive surface disposed on the cover glass layer, wherein the touch-sensitive surface comprises:
        a first portion configured to detect one or more touch inputs from one or more objects external to the device, and
        a second portion configured to detect the movement of the mechanical input element and to detect a change in capacitance.

5. The device of claim 4, further comprising circuitry configured to detect a movement of the mechanical input element by detecting the change in capacitance detected via the second portion of the touch-sensitive surface.

6. The device of claim 4, wherein the mechanical input element is disposed below the touch-sensitive surface.

7. The device of claim 4, wherein the second portion is disposed outside of a boundary of a display layer of the device.

8. The device of claim 1, wherein the controller is further configured to:
    determine that water has entered the device through the gap based on the detected capacitance between the first electrode and the second electrode.

9. The device of claim 1, wherein the controller is further configured to:
    determine that water had previously existed within the gap, but does not currently exist within the gap, based on the detected capacitance between the first electrode and the second electrode.

10. A method comprising:
    detecting, via a controller coupled to a first electrode and a second electrode, a capacitance between the first electrode and the second electrode, wherein:
        a frame is configured to secure a cover glass layer to a device;

a gap is between the frame and the cover glass layer;
the first electrode is positioned on a bottom surface of the cover glass layer and the second electrode positioned opposite the first electrode on an adjacent top surface of the frame; and
detecting the capacitance between the first electrode and the second electrode includes:
determining a dielectric constant of a substance between the first electrode and the second electrode based on the capacitance between the first electrode and the second electrode;
identifying the substance between the first electrode and the second electrode based on the determined dielectric constant; and
determining that the identified substance has entered the gap based on the determined dielectric constant.

11. The method of claim 10, wherein the first electrode and the second electrode are substantially parallel to each other.

12. The method of claim 10, wherein the device further comprises a touch-sensitive surface disposed on the cover glass layer.

13. The method of claim 10, further comprising:
determining that water has entered the device through the gap based on the detected capacitance between the first electrode and the second electrode.

14. The method of claim 10, further comprising:
determining that water had previously existed within the gap, but does not currently exist within the gap, based on the detected capacitance between the first electrode and the second electrode.

15. A non-transitory computer-readable storage medium storing instructions, which when executed by one or more processors of a device, causes the device to perform a method comprising:
detecting, via a controller coupled to a first electrode and a second electrode, a capacitance between the first electrode and the second electrode, wherein:
a frame is configured to secure a cover glass layer to the device;
a gap is between the frame and the cover glass layer;
the first electrode is positioned on a bottom surface of the cover glass layer and the second electrode positioned opposite the first electrode on an adjacent top surface of the frame; and
detecting the capacitance between the first electrode and the second electrode includes:
determining a dielectric constant of a substance between the first electrode and the second electrode based on the capacitance between the first electrode and the second electrode;
identifying the substance between the first electrode and the second electrode based on the determined dielectric constant; and
determining that the identified substance has entered the gap based on the determined dielectric constant.

16. The non-transitory computer-readable storage medium of claim 15, wherein the first electrode and the second electrode are substantially parallel to each other.

17. The non-transitory computer-readable storage medium of claim 15, the method further comprising:
determining that water has entered the device through the gap based on the detected capacitance between the first electrode and the second electrode.

18. The non-transitory computer-readable storage medium of claim 15, the device further comprising a touch-sensitive surface disposed on the cover glass layer.

19. The non-transitory computer-readable storage medium of claim 15, the method further comprising:
determining that water had previously existed within the gap, but does not currently exist within the gap, based on the detected capacitance between the first electrode and the second electrode.

20. The non-transitory computer-readable storage medium of claim 15, the device further comprising:
a mechanical input element, wherein at least a portion of the mechanical input element is disposed within the device, and the mechanical input element is manipulable by a user to cause the mechanical input element to move within the device; and
a touch-sensitive surface disposed on the cover glass layer, wherein the touch-sensitive surface comprises:
a first portion configured to detect one or more touch inputs from one or more objects external to the device, and
a second portion configured to detect the movement of the mechanical input element and to detect a change in capacitance.

* * * * *